(12) United States Patent
Armstrong

(10) Patent No.: US 6,354,840 B1
(45) Date of Patent: Mar. 12, 2002

(54) BASIC EDUCATIONAL SYSTEM

(76) Inventor: Thalia I Armstrong, 10108 S. Lafayette, Chicago, IL (US) 60628

( * ) Notice: Subject to any disclaimer, the term of this patent is extended or adjusted under 35 U.S.C. 154(b) by 0 days.

(21) Appl. No.: 09/515,189

(22) Filed: Feb. 29, 2000

Related U.S. Application Data

(63) Continuation-in-part of application No. 09/182,817, filed on Oct. 29, 1998, now Pat. No. 6,152,047.

(51) Int. Cl.$^7$ .............................. G09B 1/08; G09B 1/38
(52) U.S. Cl. .................... 434/168; 434/170; 273/157 R
(58) Field of Search ................... 434/168, 170, 434/190, 188, 207, 309, 311, 317, 92, 259; 273/157 R; 84/470 R, 471 R, 483.1, 483.2, 477 R, 472

(56) References Cited

U.S. PATENT DOCUMENTS

| | | | |
|---|---|---|---|
| 3,122,684 A | | 2/1964 | Genin |
| 3,380,176 A | | 4/1968 | Kling et al. |
| 3,715,816 A | * | 2/1973 | White |
| 4,176,473 A | * | 12/1979 | Rae |
| 4,215,432 A | * | 8/1980 | Smith .............................. 2/48 |
| 4,262,431 A | * | 4/1981 | Darnell ....................... 434/170 |
| 4,671,574 A | * | 6/1987 | Wilson-Diehl .............. 273/287 |
| 4,702,700 A | | 10/1987 | Taylor |
| 4,838,793 A | | 6/1989 | Taylor |
| 4,846,689 A | * | 7/1989 | Day ........................... 434/168 |
| 5,167,507 A | | 12/1992 | Cobb et al. |
| 5,346,399 A | | 9/1994 | Sakow |

* cited by examiner

Primary Examiner—Jacob K. Ackun, Jr.
Assistant Examiner—Bena B. Miller

(57) ABSTRACT

An educational system is provided including a recipient surface such as a cloth or base having a plurality of entities positioned thereon which are selected from the group of entities including colors, shapes, alphabetic characters, and numbers. Also included are marbles and figurines for being removably positioned adjacent to the entities.

19 Claims, 7 Drawing Sheets

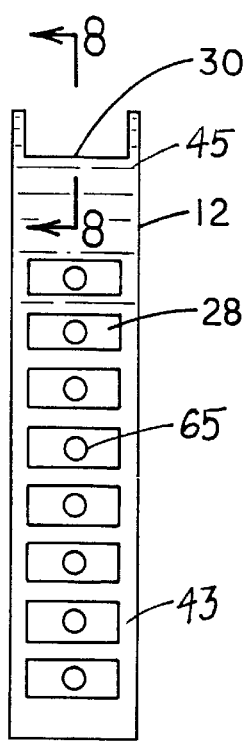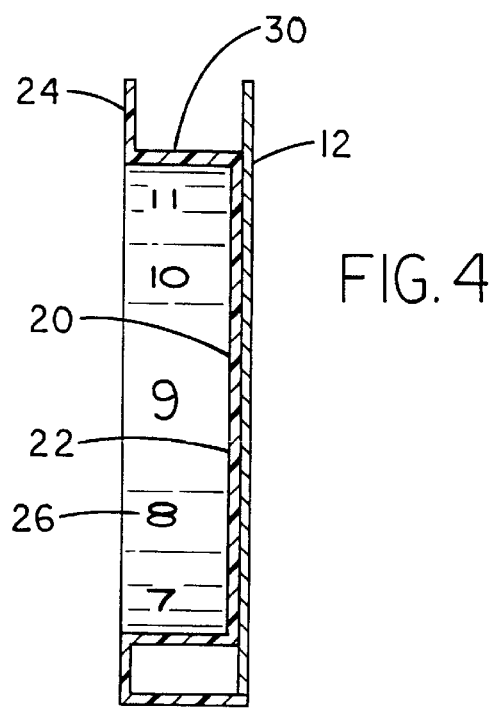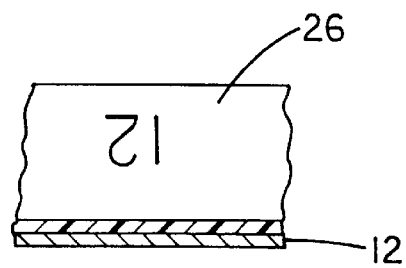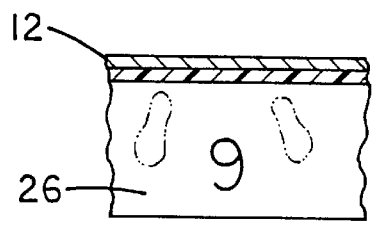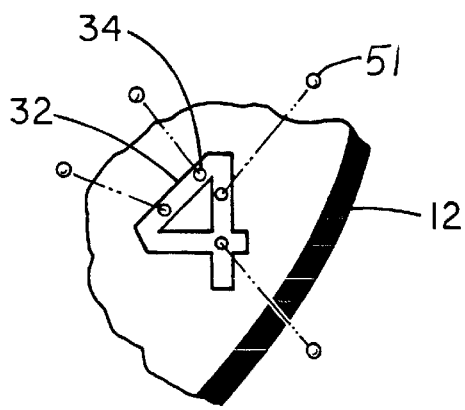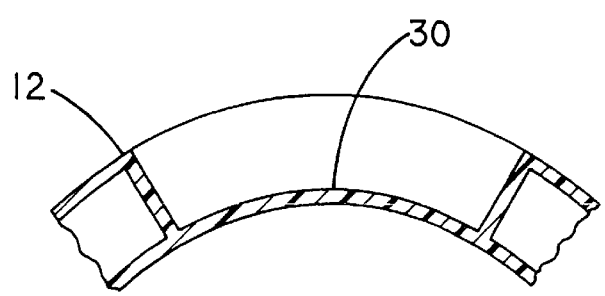

FIG.18

| at | mat |
|---|---|
| bat | pat |
| cat | rat |
| fat | Sat |
| hat | |

| cot | lot |
|---|---|
| dot | not |
| got | pot |
| hot | rot |
| jot | tot |

| bet | met |
|---|---|
| get | net |
| jet | pet |
| let | set |
| yet | vet |
| | wet |

| but | hut |
|---|---|
| cut | nut |
| gut | rut |

| it | lit |
|---|---|
| bit | pit |
| fit | sit |
| hit | wit |
| kit | |

78

61

US 6,354,840 B1

BASIC EDUCATIONAL SYSTEM

CROSS REFERENCE TO RELATED APPLICATION

This application is a continuation in part of application Ser. No. 09/182,817, filed Oct. 29, 1998 now U.S. Pat. No. 6,152,047.

BACKGROUND OF THE INVENTION

1. Field of the Invention

The present invention relates to teaching tools and more particularly pertains to a new basic educational system for utilizing color association when teaching.

2. Description of the Prior Art

The use of teaching tools is known in the prior art. More specifically, teaching tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,380,176; U.S. Pat. No. 4,846,689; U.S. Pat. No. 4,262,431; U.S. Pat. No. 4,838,793; U.S. Pat. No. 4,702,000; and U.S. Pat. No. 3,122,684.

In these respects, the basic educational system according to the present invention substantially departs from the conventional concepts and designs of the prior art, and in so doing provides an apparatus primarily developed for the purpose of utilizing color association when teaching.

SUMMARY OF THE INVENTION

In view of the foregoing disadvantages inherent in the known types of teaching tools now present in the prior art, the present invention provides a new basic educational system construction wherein the same can be utilized for utilizing color association when teaching.

The general purpose of the present invention, which will be described subsequently in greater detail, is to provide a new basic educational system apparatus and method which has many of the advantages of the teaching tools mentioned heretofore and many novel features that result in a new basic educational system which is not anticipated, rendered obvious, suggested, or even implied by any of the prior art teaching tools, either alone or in any combination thereof.

To attain this, the present invention generally comprises a white base having a front wall, a rear wall, and a periphery formed therebetween. As shown in FIG. 1, the base is defined by a planar rectangular bottom face, a pair of planar rectangular side walls, and a circular top wall. The front wall has a circular indentation formed therein in concentric relationship with the top wall. By this structure, an inset inner wall portion, an annular outer wall portion, and an intermediate peripheral wall portion are defined. For reasons that will soon become apparent, the side walls and a portion of the top wall each have a plurality of vertically aligned, uniquely colored drawers formed therein. As shown in FIG. 4, the top wall of the base has a storage indentation formed therein. As shown in FIG. 1, the front wall of the base has a plurality of black numerals each constructed from a magnetic material mounted about the outer wall portion and the intermediate peripheral wall portion of the base. As such, a clock face is defined. Each numeral has a number of recesses formed therein which corresponds with the numeral for accepting metallic marbles therein. The intermediate peripheral wall portion of the front wall of the base has a plurality of uniquely colored pie-shaped sections positioned thereon. Finally, a pair of clock hands are removably mounted on the inset inner wall portion. FIG. 2 shows a rear wall being constructed from a magnetic material and having a magnetic circular chalkboard centrally mounted thereon. As such, a peripheral area is defined. The peripheral area has an upper extent with a plurality of uniquely colored upper case alphabet characters mounted thereon. Each of the upper case alphabet characters has an associated lollipop indicia extending inwardly toward the chalkboard. The peripheral area of the rear wall of the base is further defined by a lower extent with a plurality of uniquely shaped and uniquely colored shape outlines situated thereon. Each of the shape outlines has a rectangular outline situated thereunder with a corresponding color. The chalkboard has a number line positioned thereon along a lower extent thereof. Positioned at a central extent of the chalkboard is a pair of solid lines with a dotted line positioned therebetween for writing purposes. FIG. 15 shows a plurality of planar lower case alphabet figurines each constructed from a magnetic material. The present figurines each have a unique color which corresponds to one of the upper case alphabet figurines of the upper extent of the rear wall of the base. In use, the lower case alphabet figurines are adapted for being removably secured on the chalkboard adjacent to the corresponding upper case alphabet character of the upper extent of the rear wall of the base. With reference now to FIG. 16, a plurality of planar shape figurines are each constructed from a magnetic material. The shape figurines each have a unique color and shape which correspond to one of the shape outlines of the lower extent of the rear wall of the base. The shape figurines are each adapted for being removably secured on the shape outlines of the rear wall of the base. With continuing reference to FIG. 16, a plurality of planar rectangular shape identification figurines are provided which are each constructed from a magnetic material similar to the foregoing figurines. The shape identification figurines each have indicia which corresponds to one of the shape outlines of the lower extent of the rear wall of the base. Further, the shape identification figurines each have a color which corresponds to one of the rectangular outlines of the lower extent of the rear wall of the base. FIG. 14 shows a plurality of planar rectangular color identification figurines each constructed from a magnetic material. The color identification figurines each have indicia which corresponds to one of the colors of the inset inner wall portion of the front wall of the base. Finally, a plurality of word cards are provided as shown in FIG. 17. Each of the word cards are constructed from a magnetic material and are divided into a plurality of sets each having a unique color. Each set of word cards has a plurality of first letter cards each including a first face with a lower case version of a unique first letter positioned thereon. The word cards further have a second face with an upper case version of the first letter positioned thereon. Each set further has a single play card having a first face with at least two letters positioned thereon. A second face of the play card is equipped with a plurality of words listed thereon which each represent an amalgamation of the letter of one of the first letter cards and the letters of the first face of the play card. The sets of word cards are removably positionable within one of the drawers of the base that has a corresponding color.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, not is it intended to be limiting as to the scope of the invention in any way.

It is therefore an object of the present invention to provide a new basic educational system apparatus and method which has many of the advantages of the teaching tools mentioned heretofore and many novel features that result in a new basic educational system which is not anticipated, rendered obvious, suggested, or even implied by any of the prior art teaching tools, either alone or in any combination thereof.

It is another object of the present invention to provide a new basic educational system which may be easily and efficiently manufactured and marketed.

It is a further object of the present invention to provide a new basic educational system which is of a durable and reliable construction.

An even further object of the present invention is to provide a new basic educational system which is susceptible of a low cost of manufacture with regard to both materials and labor, and which accordingly is then susceptible of low prices of sale to the consuming public, thereby making such basic educational system economically available to the buying public.

Still yet another object of the present invention is to provide a new basic educational system which provides in the apparatuses and methods of the prior art some of the advantages thereof, while simultaneously overcoming some of the disadvantages normally associated therewith.

Still another object of the present invention is to provide a new basic educational system for utilizing color association when teaching.

Even still another object of the present invention is to provide a new basic educational system that includes a recipient surface having a plurality of entities positioned thereon which are selected from the group of entities including colors, shapes, alphabetic characters, and numbers. Also included are marbles and figurines for being removably positioned adjacent to the entities.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the present invention.

FIG. 4 is a side cross-sectional view of the present invention taken along line 8—8 shown in FIG. 3.

FIG. 5 is a top view of the intermediate peripheral wall portion of the front wall of the present invention.

FIG. 6 is a top view of the intermediate peripheral wall portion of the front wall of the present invention.

FIG. 7 is a front view of one of the numerals of the front face of the present invention.

FIG. 8 is a top cross-sectional view of the top indentation of the base of the present invention.

FIG. 18 is a rear view of the play cards of the present invention.

DESCRIPTION OF THE PREFERRED EMBODIMENT

Figure 1:
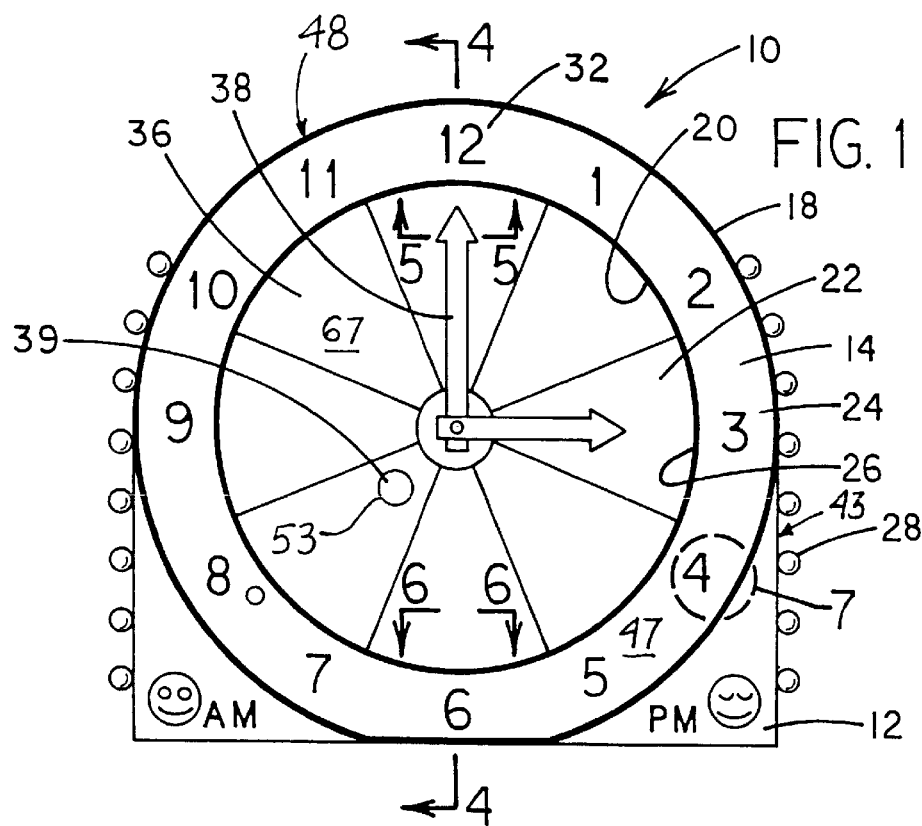
FIG. 1 is a front view of a new basic educational system according to the present invention.

With reference now to the drawings, and in particular to FIGS. 1 through 19 thereof, a new basic educational system embodying the principles and concepts of the present invention and generally designated by the reference numeral 10 will be described.

The present invention, designated as numeral 10, includes a white base 12 having a front wall 14, a rear wall 16, and a periphery 18 formed therebetween. As shown in FIG. 1, the base is defined by a planar rectangular bottom face, a pair of planar rectangular side walls, and a circular top wall. The front wall has a circular indentation 20 formed therein in concentric relationship with the top wall. By this structure, an inset inner wall portion 22, an annular outer wall portion 24, and an intermediate peripheral wall portion 26 are defined. For reasons that will soon become apparent, the side walls and a portion of the top wall each have a plurality of vertically aligned, uniquely colored drawers 28 formed therein. As shown in FIG. 4, the top wall of the base has a storage indentation 30 formed therein.

As shown in FIG. 1, the front wall of the base has a plurality of black numerals 32 each constructed from a magnetic material mounted about the outer wall portion and the intermediate peripheral wall portion of the base. In the preferred embodiment, the entire front wall is constructed from a magnetic material in order to allow for the placement of the figurines of FIG. 13 near numerals while teaching. As such, a clock face is defined. Each numeral has a number of recesses 34 formed therein which corresponds with the numeral. Each front wall numeral is further raised or protruding. Such recesses are adapted for accepting metallic marbles therein. The inset inner wall portion of the front wall of the base has a plurality of uniquely colored pie-shaped sections 36 positioned thereon. Finally, a pair of clock hands 38 are removably mounted on the inset inner wall portion of the front wall.

In the preferred embodiment, each of the colored pie-shaped sections and each of the numerals of the front wall have a dedicated audio device 39 positioned adjacent thereto. Each audio device preferably has a push button for audibly identifying the colored section or numeral upon the depression thereof.

Figure 2:
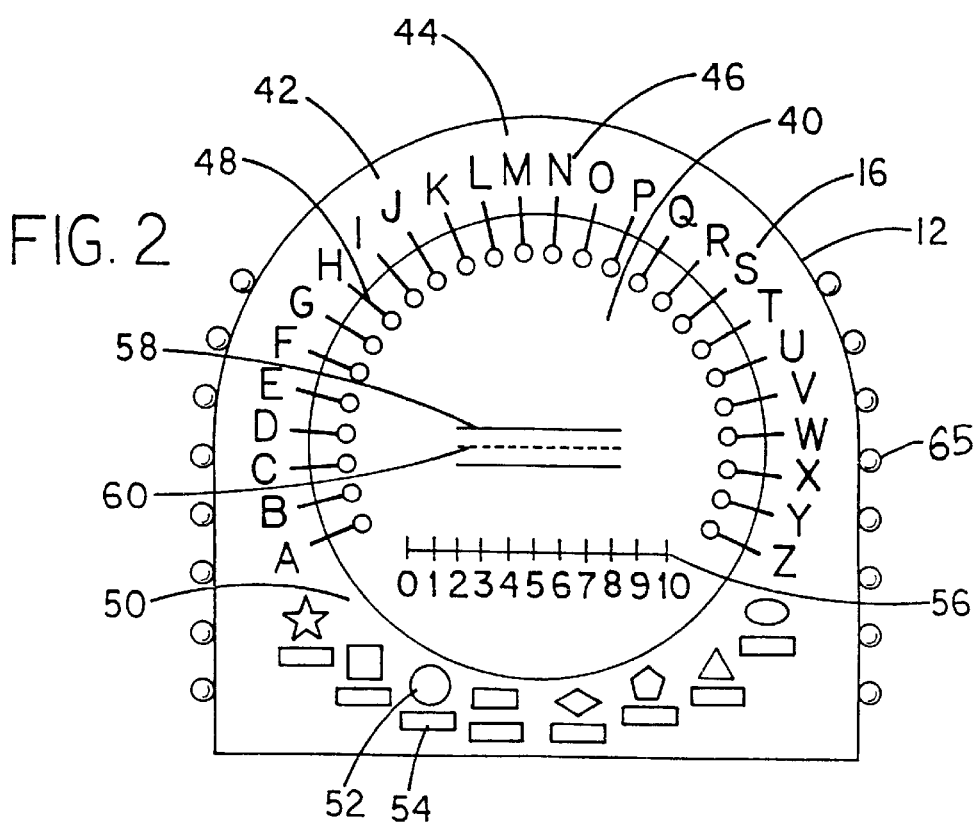
FIG. 2 is a rear view of the present invention.

FIG. 2 shows a rear wall of the base being constructed from a magnetic material and having a magnetic circular chalkboard 40 centrally mounted thereon. As such, a peripheral area 42 is defined. The peripheral area has an upper extent 44 with a plurality of uniquely colored upper case alphabet characters 46 mounted thereon. Each of the upper case alphabet characters has associated lollipop indicia 48 extending inwardly toward the chalkboard with a color similar to that of the associated upper case alphabet character. It should be noted that the lollipops extend to and are a part of the outer edge of the board. Ideally, the lollipop indicia and alphabet characters of the rear wall of the base are raised, or protruding. The peripheral area of the rear wall of the base is further defined by a lower extent 50 with a plurality of uniquely shaped and uniquely colored shape outlines 52 situated thereon. Each of the shape outlines has a rectangular outline 54 situated thereunder with a corresponding color. The chalkboard has a number line 56 positioned thereon along a lower extent thereof. Positioned at a central extent of the chalkboard is a pair of solid lines 58 with a dotted line 60 positioned therebetween for writing purposes.

Figure 15:
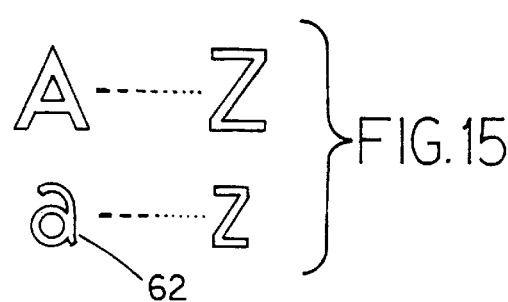
FIG. 15 is an exploded view of the alphabet figurines of the present invention.

FIG. 15 shows a plurality of planar lower case alphabet figurines 62 each constructed from a magnetic material. The present figurines each have a unique color which corresponds to one of the upper case alphabet figurines of the upper extent of the rear wall of the base. In use, the lower case alphabet figurines are adapted for being removably secured on the chalkboard adjacent to the corresponding upper case alphabet character of the upper extent of the rear wall of the base. Ideally, the lower case alphabet figurines are adapted for being removably secured on the chalkboard adjacent to or on the lollipops of the corresponding upper case.

Figure 16:
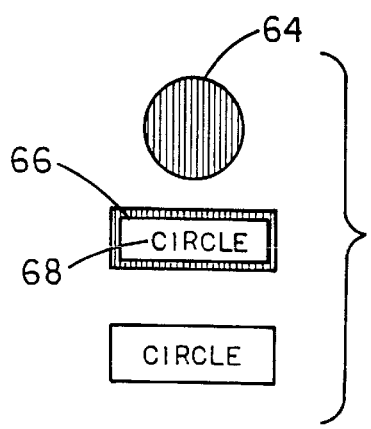
FIG. 16 is an exploded view of the shape identification figurines of the present invention.

With reference now to FIG. 16, a plurality of planar shape figurines 64 are each constructed from a magnetic material. The shape figurines each have a unique color and shape which correspond to one of the shape outlines of the lower extent of the rear wall of the base. In use, the shape figurines are each adapted for being removably secured on the shape outlines of the rear wall of the base.

With continuing reference to FIG. 16, a plurality of planar rectangular shape identification figurines 66 are provided which are each constructed from a magnetic material similar to the foregoing figurines. The shape identification figurines each have indicia 68 which corresponds to one of the shape outlines of the lower extent of the rear wall of the base. Further, the shape identification figurines each have a color which corresponds to one of the rectangular outlines of the lower extent of the rear wall of the base.

Figure 14:
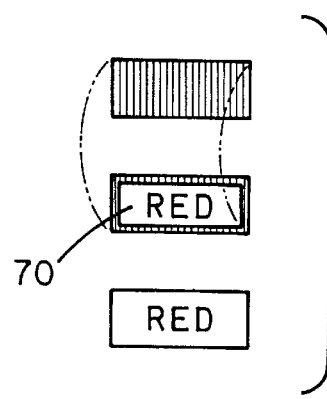
FIG. 14 is an exploded view of the color identification figurines of the present invention.

FIG. 14 shows a plurality of planar rectangular color identification figurines 70 each constructed from a magnetic material. The color identification figurines each have indicia which corresponds to one of the colors of the inset inner wall portion of the front wall of the base. In use, the color identification figurines may be removably secured on one of the pie-shaped sections of the front wall of the base.

In the case of each of the figurines discussed hereinabove, it should be noted that the same may be constructed in two sets one of which has colors positioned thereon and one of which that is without colors. Note FIGS. 14 & 16. As such, a teacher may choose whether he or she wishes to employ color association for teaching purposes. This option is also critical when administering tests and the like.

Figure 17:
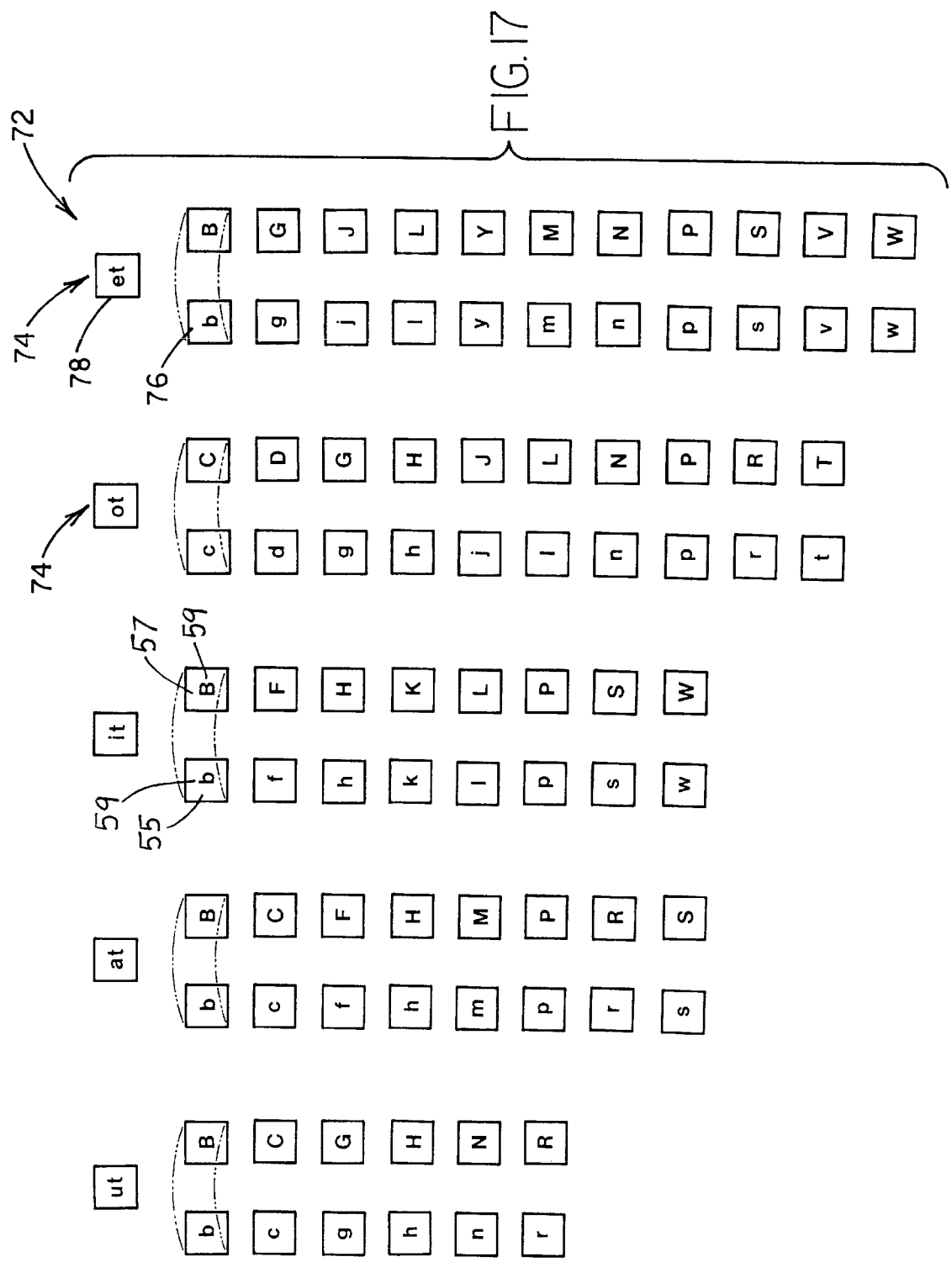
FIG. 17 is an exploded view of the word cards of the present invention.
Figure 19:
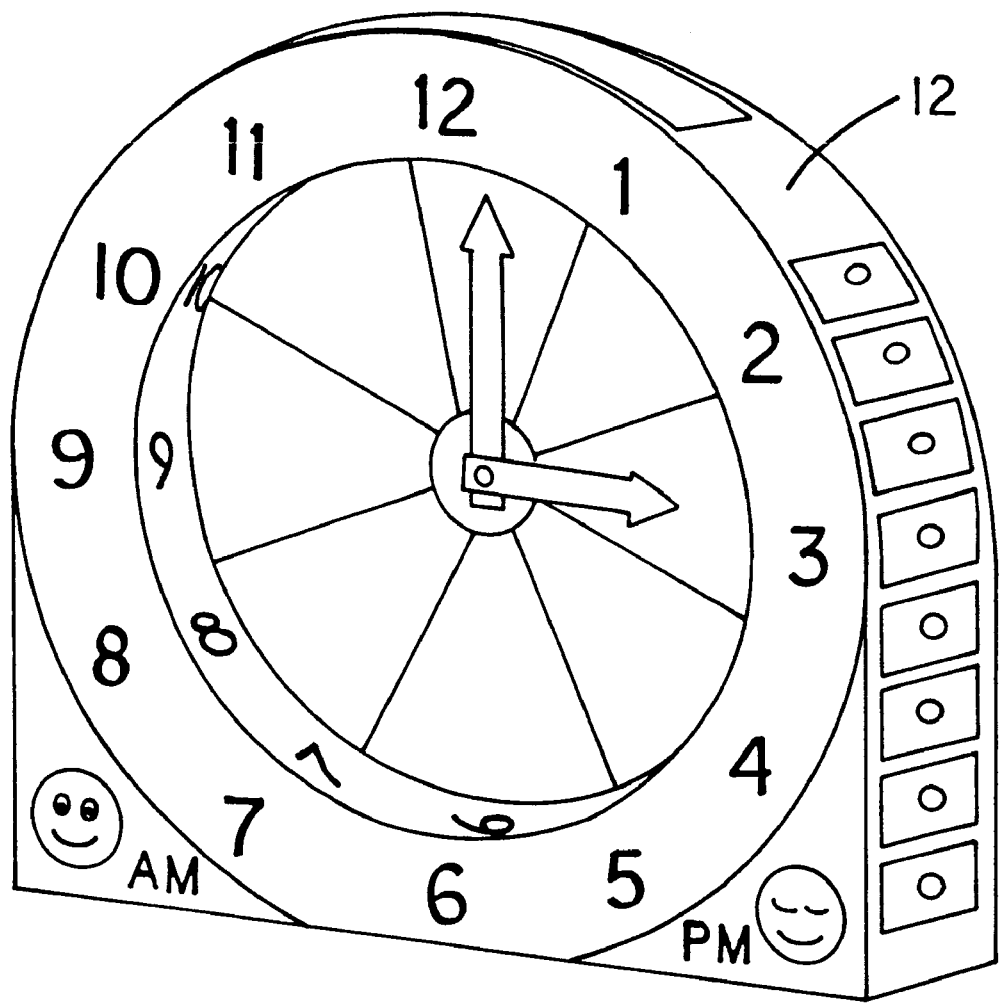
FIG. 19 is a perspective view of the present invention.

Finally, a plurality of word cards 72 are provided as shown in FIGS. 17 & 18. Each of the word cards are constructed from a magnetic material and are divided into a plurality of sets 74 each having a unique color. Each set of word cards has a plurality of first letter cards 76 each including a first face with a lower case version of a unique first letter positioned thereon. The word cards further have a second face with an upper case version of the first letter positioned thereon. Each set further has a single play card 78 having a first face with at least two letters positioned thereon. A second face of the play card is equipped with a plurality of words listed thereon which each represent an amalgamation of the letter of one of the first letter cards and the letters of the first face of the play card. The sets of word cards are removably positionable within one of the drawers of the base that has a corresponding color. Ideally, the knobs of the drawers identify the two letters of the play card that is situated therein. As such, the word cards may be used to generate words for educational purposes.

Figure 9:
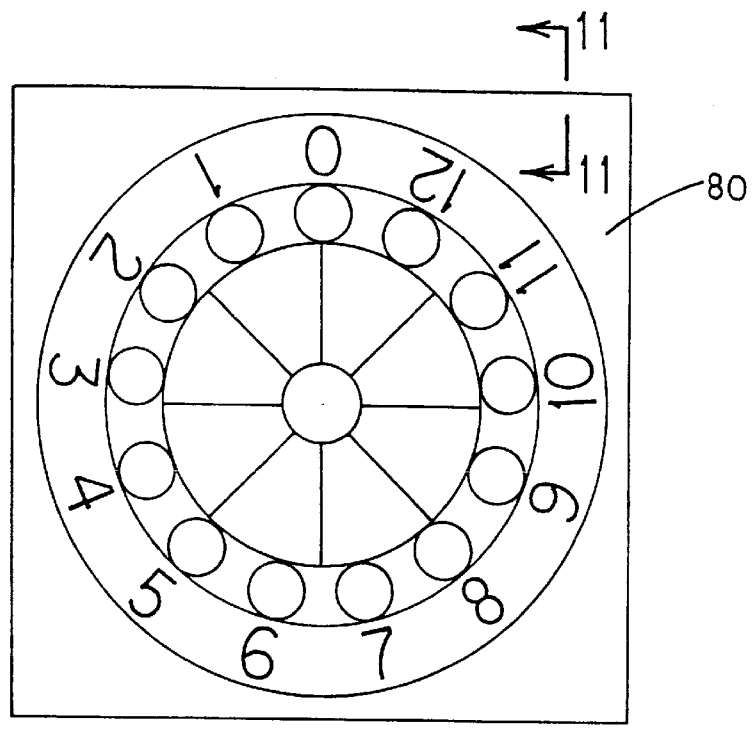
FIG. 9 is a top view of an alternate embodiment of the present invention.
Figure 10:
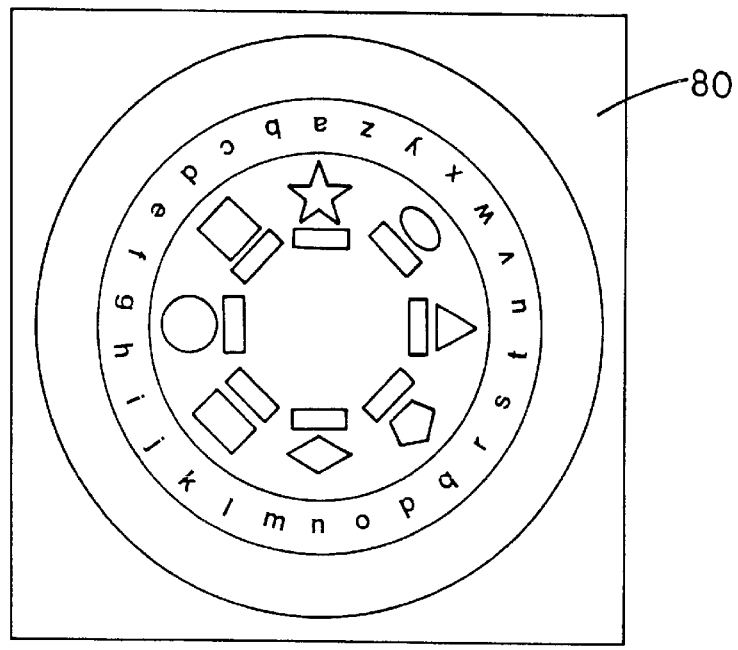
FIG. 10 is a top view of another alternate embodiment of the present invention.
Figure 11:
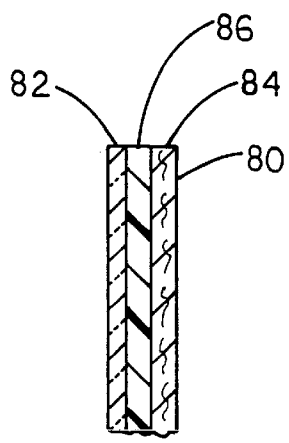
FIG. 11 is a cross-sectional view of the present invention as taken along line 11—11 shown in FIG. 9.
Figure 12:
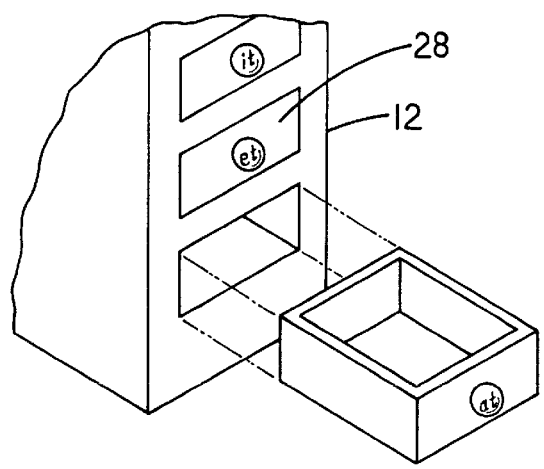
FIG. 12 is a perspective view of one of the drawers of the present invention.
Figure 13:
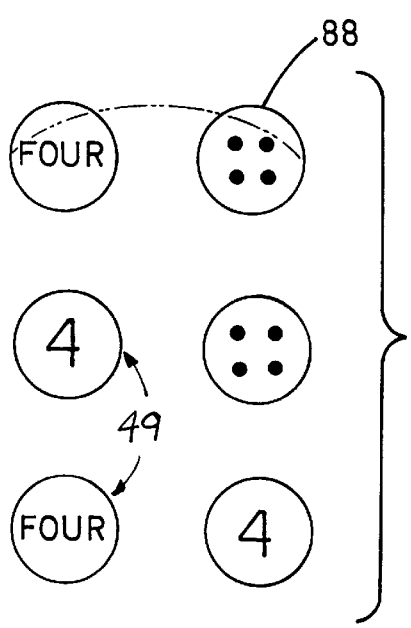
FIG. 13 is an exploded view of the pieces to be used with the embodiment of FIG. 9.

In an alternate embodiment, a base may be excluded in favor of or used in combination with at least one flexible panel, such as a pair of oil cloths 80, as shown in FIGS. 9 & 10. As shown in FIG. 11, each cloth has a transparent outer layer 82, a fabric inner layer 84, and a printed plastic layer 86 therebetween. As shown in FIG. 9, a first one of the cloths has colored pie-shaped sections and peripheral numerals similar to the front wall of the base. FIG. 13 shows a plurality of circular pieces 88 which may be used in combination with the cloth of FIG. 9 for identifying the numerals. Ideally, numerals and dots of the circular pieces are raised and magnetic. Further, figurines similar to those of FIG. 14 may be used to identify the colors. As shown in FIG. 10, a second one of the cloths has letters and shape outlines similar to the rear wall of the base. In such embodiment, figurines similar to those shown in FIG. 15 and 16 may be used for identification purposes. As an option, however, such figurines need not be magnetic and sizes may vary with respect to the figurines associated with the base.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An educational system comprising:
   at least one flexible panel including a plurality of indicia marked thereon;
   matching elements for being removably positioned adjacent to the indicia;
   wherein the indicia includes a plurality of colored substantially triangular sections and a plurality of numerals arranged about the periphery of the plurality of substantially triangular sections;
   wherein the indicia defines a central area and about the central area;
   wherein the indicia includes a plurality of uniquely colored shape outlines positioned on the central area; and
   wherein the matching elements include a plurality of shape figurines each having a unique color and shape which corresponds to one of the shape outlines of the central area of the panel for being removably secured on the panel adjacent to a corresponding shape outline.

2. The educational system of claim 1 wherein the matching elements are couplable to the panel by fastening means for removably fastening the matching elements to the panel.

3. The educational system of claim 2 wherein the fastening means comprises magnets.

4. The educational system of claim 1 wherein the panel has a transparent outer layer, a fabric inner layer, and a plastic layer situated between the inner and outer layers with indicia marked thereon.

5. The educational system of claim 1 wherein the matching elements include a plurality of circular pieces having numerals indicated thereon for matching with at least one of the plurality of numerals on the panel.

6. The educational system of claim 5 wherein the numerals on the circular pieces are raised.

7. The educational system of claim 1 wherein the matching elements include a plurality of circular pieces having a number of dots thereon for matching with at least one of the plurality of numerals on the panel.

8. The educational system of claim 7 wherein the dots on the circular pieces are raised.

9. The educational system of claim 1 wherein the indicia includes a plurality of uniquely-colored lower case alphabet characters marked on the peripheral ring.

10. The educational system of claim 9 wherein the matching elements include a plurality of upper case alphabet figurines each having a unique color which corresponds to one of the lower case alphabet figurines of the peripheral ring of the panel for being removably secured on the panel adjacent to the corresponding lower case alphabet character.

11. The educational system of claim 1 wherein each of the shape outlines has indicia associated therewith including a rectangular outline, each of the rectangular outlines having a color corresponding to the shape outline associated therewith.

12. The educational system of claim 11 wherein the matching elements include a plurality of rectangular shape identification figurines each having indicia which corresponds to one of the shape outlines of the central area of the panel, and each shape identification figurine being colored to correspond to one of the rectangular outlines of the central area of the panel.

13. The educational system of claim 1 wherein the matching elements include a plurality of rectangular color identification figurines each having indicia which corresponds to one of the colors of the central area of the panel.

14. An educational system comprising:
   a pair of flexible panels each including a plurality of indicia marked thereon, wherein at least one of the panels has a transparent outer layer, a fabric inner layer, and a plastic layer situated between the inner and outer layers with indicia marked thereon;
   matching elements for being removably positioned adjacent to the indicia, the matching elements being couplable to the panel by fastening means for removably fastening the matching elements to the panel;
   wherein a first one of the panels has indicia including a plurality of colored substantially triangular sections and a plurality of numerals arranged about the periphery of the plurality of triangular sections, wherein the matching elements include a plurality of circular pieces having a numeral indicated thereon for matching with at least one of the plurality of numerals on the first panel and the numerals on the circular pieces are raised, wherein the matching elements include a plurality of circular pieces having a number of dots thereon for matching with at least one of the plurality of numerals on the first panel and the dots on the circular pieces are raised; and
   wherein a second one of the panels has indicia defines a central area and a peripheral ring about the central area, the indicia including a plurality of differently colored lower case alphabet characters marked on the peripheral ring, the indicia including a plurality of differently colored shape outlines positioned on the central area, the shape outlines each having indicia including a rectangular outline associated therewith, the rectangular outline having a color corresponding to one of the shape outlines, the matching elements including a plurality of planar upper case alphabet figurines each having a unique color which corresponds to one of the lower case alphabet figurines of the peripheral ring of the second panel for being removably secured on the second panel adjacent to the corresponding lower case alphabet character, the matching elements including a plurality of planar shape figurines each having a unique color and shape which correspond to one of the shape outlines of the central area of the panel for being removably secured on the second panel adjacent to the corresponding shape outline, the matching elements including a plurality of planar rectangular shape identification figurines each having indicia which corresponds to one of the shape outlines of the central area of the second panel, each of the shape identification figurine being colored to correspond to one of the rectangular outlines of the central area of the second panel, the matching elements including a plurality of planar rectangular color identification figurines each having indicia which corresponds to one of the colors of the central area of the second panel.

15. An educational system comprising:

at least one flexible panel including a plurality of indicia marked thereon;

matching elements for being removably positioned adjacent to the indicia;

wherein the indicia includes a plurality of colored substantially triangular sections and a plurality of numerals arranged about the periphery of the plurality of triangular sections;

wherein the indicia includes a plurality of uniquely-colored lower case alphabet figurines marked on the peripheral ring; and wherein the matching elements include a plurality of upper case alphabet figurines each having a unique color which corresponds to one of the lower case alphabet figurines of the peripheral ring of the panel for being removably secured on the panel adjacent to the corresponding lower case alphabet character.

16. The educational system of claim 15 wherein the matching elements are couplable to the panel by fastening means for removably fastening the matching elements to the panel.

17. The educational system of claim 16 wherein the fastening means comprises magnets.

18. The educational system of claim 15 wherein the panel has a transparent outer layer, a fabric inner layer, and a plastic layer situated between the inner and outer layers with indicia marked thereon.

19. The educational system of claim 15 wherein the indicia defines a central area and a peripheral ring about the central area.

* * * * *

UNITED STATES PATENT AND TRADEMARK OFFICE
CERTIFICATE OF CORRECTION

PATENT NO.     : 6,354,840 B1
DATED          : March 12, 2002
INVENTOR(S)    : Thalia I Armstrong It is certified that error appears in the above-identified patent and that said Letters Patent is hereby corrected as shown below:

<u>Title page,</u>
Item [63], "Continuation-in-part of application No. 09/182,817, filed on Oct. 29, 1998, now Pat. No. 6,152,047" should read -- Continuation-in-part of application No. 09/252,111, filed on Feb. 18, 1999, now Pat. No. 6,030,228 --.

Signed and Sealed this

Twenty-ninth Day of October, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

| | |
|---|---|
| PATENT NO. | : 6,354,840 B1 |
| APPLICATION NO. | : 09/515189 |
| DATED | : March 12, 2002 |
| INVENTOR(S) | : Thalia I Armstrong |

Page 1 of 1

It is certified that error appears in the above-identified patent and that said Letters Patent is hereby corrected as shown below:

Title page,
Item [63], "Continuation-in-part of application No. 09/182,817, filed on Oct. 29, 1998, now Pat. No. 6,152,047" should read -- Continuation-in-part of application No. 09/252,111, filed on Feb. 18, 1999, now Pat. No. 6,030,228 --.

Column 1
Lines 4-6, should read -- This application is a continuation in part of application Ser. No. 09/252,111, filed on Feb. 18,1999, now Pat. No. 6,030,228. --.

This certification supersedes the Certificate of Correction issued October 29, 2002.

Signed and Sealed this

Twenty-ninth Day of January, 2008

JON W. DUDAS
*Director of the United States Patent and Trademark Office*